(12) United States Patent
Choi

(10) Patent No.: US 8,957,558 B2
(45) Date of Patent: Feb. 17, 2015

(54) LINEAR VIBRATION GENERATOR

(75) Inventor: Jun-Kun Choi, Suwon-si (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 921 days.

(21) Appl. No.: 12/908,655

(22) Filed: Oct. 20, 2010

(65) Prior Publication Data

US 2011/0089773 A1    Apr. 21, 2011

(30) Foreign Application Priority Data

Oct. 20, 2009   (KR) .................. 10-2009-0099555

(51) Int. Cl.
*H02K 7/06*      (2006.01)
*H02K 33/16*     (2006.01)
*G06F 3/01*      (2006.01)

(52) U.S. Cl.
CPC ............ *H02K 33/16* (2013.01); *G06F 3/016* (2013.01)
USPC .............. 310/81; 601/57; 600/38; 310/36; 310/38; 310/14; 310/15; 310/17; 340/407.1

(58) Field of Classification Search
USPC ............. 310/12–20, 36, 38, 81; 340/407.1; 318/417
See application file for complete search history.

(56) References Cited

U.S. PATENT DOCUMENTS

| | | | | |
|---|---|---|---|---|
| 4,005,703 A | * | 2/1977 | Rosen et al. .................. 601/57 |
| 4,433,926 A | * | 2/1984 | Isobe et al. ............... 400/124.12 |
| 5,707,023 A | * | 1/1998 | Ichikawa et al. .............. 242/388 |
| 6,051,900 A | * | 4/2000 | Yamaguchi ..................... 310/81 |
| 6,160,331 A | * | 12/2000 | Morreale ......................... 310/51 |
| 6,251,493 B1 | * | 6/2001 | Johnson et al. ................. 428/71 |
| 6,297,629 B1 | * | 10/2001 | Peilloud ..................... 324/207.25 |
| 6,534,886 B2 | * | 3/2003 | An et al. ........................ 310/81 |
| 6,980,394 B2 | * | 12/2005 | Inoue et al. ................ 360/99.08 |
| 7,038,335 B2 | * | 5/2006 | Choi et al. ................. 310/12.24 |

(Continued)

FOREIGN PATENT DOCUMENTS

| | | | | |
|---|---|---|---|---|
| JP | 61052412 A | * | 3/1986 | ............. F16C 32/04 |
| KR | 1020040047256 | * | 6/2004 | ............. H02K 33/02 |
| KR | 10-2009-0074116 | | 7/2009 | |

OTHER PUBLICATIONS

English Translation of Korean Patent Application 10-2004-0047256. Accessed online Apr. 7, 2014 via KIPRIS <http://engpat.kipris.or.kr>.*

(Continued)

*Primary Examiner* — Scott Medway
(74) *Attorney, Agent, or Firm* — McDermott Will & Emery LLP

(57) ABSTRACT

A linear vibration generator is disclosed. The linear vibration generator in accordance with an embodiment of the present invention includes a stationary part, which has a polygonal-prism-shaped coil and in which the polygonal-prism-shaped coil induces a magnetic field by having an electric current supplied, a vibrating part, which has a polygonal-prism-shaped magnet and in which a portion of the polygonal-prism-shaped magnet is inserted into the coil, an elastic member, which is coupled to the stationary part and elastically supports the vibrating part such that the vibrating part can move linearly, and a lubricating band, which is formed on an outer circumferential surface of the magnet.

7 Claims, 5 Drawing Sheets

(56) References Cited

U.S. PATENT DOCUMENTS

| 8,134,259 | B2* | 3/2012 | Choi | 310/25 |
|---|---|---|---|---|
| 2005/0023906 | A1* | 2/2005 | Cheung | 310/15 |
| 2005/0285454 | A1* | 12/2005 | Choi et al. | 310/14 |
| 2006/0208179 | A1* | 9/2006 | Itami | 250/234 |
| 2007/0145841 | A1* | 6/2007 | Zhao et al. | 310/81 |
| 2008/0306332 | A1* | 12/2008 | Choi et al. | 600/38 |

OTHER PUBLICATIONS

English translation of Chinese Office Action issued in Chinese Patent Application No. 201010244109.1 dated Jul. 20, 2012.

Korean Office Action, w/ partial English translation thereof, issued in Korean Patent Application No. KR 10-2009-0099555 dated Feb. 21, 2011.

* cited by examiner

LINEAR VIBRATION GENERATOR

CROSS-REFERENCE TO RELATED APPLICATIONS

This application claims the benefit of Korean Patent Application No. 10-2009-0099555, filed with the Korean Intellectual Property Office on Oct. 20, 2009, the disclosure of which is incorporated herein by reference in its entirety.

BACKGROUND

1. Technical Field

The present invention is related to a linear vibration generator.

2. Description of the Related Art

A vibration motor is a part that converts electrical energy into mechanical vibrations by using the principle of generating electromagnetic forces, and is commonly installed in a mobile terminal, such as a mobile phone and a PDA, to generate a soundless vibrating alert. With the rapid expansion of mobile terminal markets and increased functionalities added to the mobile terminal, the mobile terminal is increasingly required to be smaller and better. As a result, there has been an increased demand for the development of a new structure of vibration motor that can overcome the shortcoming of conventional vibration motors and effectively improve the quality.

As mobile terminals having a bigger LCD screen have become popular for the past few years, there have been an increasing number of mobile terminals adopting a touch-screen method, by which the body or screen of a mobile terminal is vibrated when a user touches an input unit of the mobile terminal in order to provide the user an appealing sensory feel when touching the touch screen. Commonly used to generate the vibration is a vibration motor.

The touch-screen method particularly requires that the vibration motor has a greater durability due [[the]] to a greater frequency of generating vibrations in response to the touch compared to the vibration bell for incoming calls and that the vibration motor has a faster response to the touch made on the touch screen, in order to provide the user a greater satisfaction from sensing the vibration when touching the touch screen.

The conventional vibration motors commonly used in mobile phones generate a rotational force to cause mechanical vibrations by rotating an eccentric (unbalanced) rotor. The rotational force is generated by supplying an electric current to the coil of a rotor by using the rectifying action of a brush and a commutator.

The vibration motor using such brush and commutator has a shorter operating lifetime due to mechanical friction and electrical sparks, which cause wear and black powder, while the brush moves between the segments of the commutator when the motor rotates. Moreover, when voltage is supplied to the vibration motor, it takes time to reach the target amount of vibration, i.e., the magnitude by which it is sufficient for the user to sense the vibration, by the rotational inertia of the vibration motor, causing a slower response to the touch made on the touch screen.

Developed to overcome the drawbacks of shorter operating lifetime and slower responsiveness is a linear vibration generator. The linear vibration generator does not use the principle of rotation of a motor but uses an electromagnetic force having a predetermined resonant frequency to generate vibrations by use of a stationary part installed in the linear vibration generator and the mass of a vibrating part elastically supported to the stationary part by an elastic member.

In the linear vibration generator, however, the vibrating part may have friction with the stationary part due to shocks applied in a direction that is different from the linear direction of the vibrating part when the vibrating part vibrates. If the amplitude of the vibrating part becomes wider, the vibrating part may collide with the stationary part, causing noise.

SUMMARY

The present invention provides a linear vibration generator by which a stable linear vibration can be obtained and noise can be prevented from occurring.

An aspect of the present invention provides a linear vibrator that includes a stationary part, which has a polygonal-prism-shaped coil and in which the polygonal-prism-shaped coil induces a magnetic field by having an electric current supplied, a vibrating part, which has a polygonal-prism-shaped magnet and in which a portion of the polygonal-prism-shaped magnet is inserted into the coil, an elastic member, which is coupled to the stationary part and elastically supports the vibrating part such that the vibrating part can move linearly, and a lubricating band, which is formed on an outer circumferential surface of the magnet.

Each of the coil and the magnet can have a rectangular pillar shape.

The linear vibration generator can further include a buffer, which absorbs a shock generated when the vibrating part collides with the stationary part. The buffer can include a first cushion, which is coupled to a surface of the stationary part and in which the surface faces one surface of the magnet. The buffer can include a second cushion, which is coupled to a surface of the vibrating part and in which the surface faces the other surface of the magnet. The second cushion can include a magnetic fluid gathered by a magnetic force of the magnet at a portion of the elastic member.

A portion of the lubricating band can be in contact with an inner surface of the coil, and the lubricating band can include a magnetic fluid gathered by a magnetic force of the magnet at an outer circumferential surface of the magnet.

The stationary part can include a base having the coil fixed thereto and a housing, which is coupled to the base and covers the coil. The vibrating part can include a yoke, which has a one side closed hollow part formed therein and in which the magnet is coupled to the hollow part, and a weight, which is coupled to an outer side of the yoke.

Additional aspects and advantages of the present invention will be set forth in part in the description which follows, and in part will be obvious from the description, or may be learned by practice of the invention.

DETAILED DESCRIPTION

Figure 1:
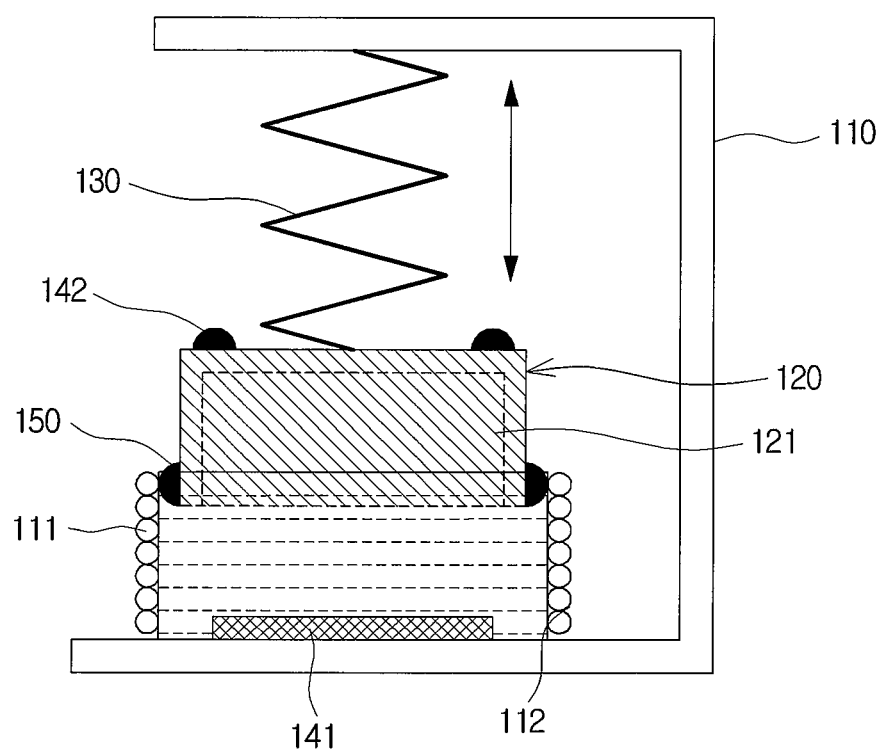
FIG. 1 illustrates the configuration of a linear vibration generator in accordance with an embodiment of the present invention.

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In the description of the present invention, certain detailed descriptions of related art are omitted when it is deemed that they may unnecessarily obscure the essence of the invention.

The features and advantages of this invention will become apparent through the below drawings and description.

FIG. 1 illustrates the configuration of a linear vibration generator in accordance with an embodiment of the present invention.

Referring to FIG. 1, a linear vibration generator 100 in accordance with an embodiment of the present invention includes a stationary part 110, a vibrating part 120 and an elastic member 130.

A rectangular pillar-shaped coil 111 is provided in the stationary part 110, and a guide surface 112 with a rectangular cross-section is formed inside the coil 111.

Both end parts of the elastic member 130 are coupled to the stationary part 110 and the vibrating part 120, respectively, and the vibrating part 120 is elastically supported by the elastic member 130 in such a way that a portion of the vibrating part 120 is inserted inside the coil 111. A magnet 121 is provided in the vibrating part 120.

If an electric current is applied to the coil 111, the coil 111 forms a magnetic field. Once the magnetic field is formed around the coil 111, the vibrating part 120 having the magnet 121, which is a permanent magnet, is moved by the magnetic force. Here, the N-pole and S-pole of the magnet 121 can be disposed in such a way that the vibrating part 120 can move in the directions of the arrow.

Therefore, if the electric current applied to the coil 111 has a particular frequency, the magnet 121 can reciprocate, i.e., vibrate linearly, in the directions of the arrow, according to the frequency of the electric current. Particularly, if the frequency of the electric current applied to the coil 111 is the same as the natural frequency of the vibrating part 120, the vibrating part 120 can produce a resonance effect and thus have a maximum amplitude.

The resonant frequency of the vibrating part 120 can be expressed in the following mathematical equation 1.

$$F \propto \frac{1}{2\pi}\sqrt{\frac{k}{m}}$$ [Mathematical Equation 1]

Here, F is the frequency of the vibrating part 120, k the modulus of elasticity of the elastic member 130, and m the mass of the vibrating part 120.

If the vibrating part 120 produces a resonance effect, the amplitude of the vibrating part 120 can be too increased to cause the vibrating part 120 to collide with the stationary part 110, causing noise. In order to prevent the noise, the linear vibration generator 100 in accordance with an embodiment of the present invention includes a buffer.

The buffer includes a first cushion 141 and a second cushion 142. The first cushion 141 is coupled to the stationary part 110 at a side that faces a surface of the magnet 121, which is positioned in the vibrating part 120. The second cushion 142 is coupled to the vibrating part 120 at a side that faces the other surface of the magnet 121.

The first cushion 141 and the second cushion 142 can be made of an elastic material, such as rubber, synthetic resin and cork, in such a way that the first cushion 141 and the second cushion 142 can absorb shocks. Here, a magnetic fluid can be used for the second cushion 142.

Some examples of the magnetic fluid, in which magnetic powder is stabilized and dispersed in a colloidal form in a liquid and then a surfactant is added to the liquid such that sedimentation or flocculation of the magnetic powder does not occur by the gravity or magnetic field, include oil or water having triiron tetraoxide or iron-cobalt alloy particles dispersed therein and toluene with cobalt dispersed therein. The magnetic powder is ultrafine powder of 0.01 to 0.02 μm and performs a geometric Brownian motion, which is typical of ultrafine particles. In the magnetic fluid, the density of particles of the magnetic powder is maintained constant even though a magnetic field, gravity or centrifugal force is applied to the magnetic fluid.

If the magnetic fluid is adhered to the vibrating part 120, the magnetic force of the magnet 121 converges the magnetic fluid to a particular place to form the second cushion 142, as illustrated in FIG. 1.

Therefore, if the vibrating part 120 collides with the stationary part 110 while the vibrating part 120 vibrates at a large amplitude due to the resonance effect, the buffer, i.e., the first cushion 141 and the second cushion 142, can absorb shocks, preventing noise from occurring.

As described above, if the vibrating part 120 vibrates in the directions of the arrow, as illustrated in FIG. 1, the vibrating part 120 moves at a very fast speed with respect to the coil 111. Here, since the vibrating part 120 is guided by the guide surface 112 formed inside the coil 111, if an external shock is applied in a direction other than the vibration directions of the vibrating part 120, the vibrating part 120 may collide or have friction with the guide surface 112, thus causing noise.

To prevent the noise, a lubricating band 150 can be formed on an outer circumferential surface of the magnet 121. The lubricating band 150 is formed in such a way that a portion of the lubricating loop 150 can be in contact with an inner surface, i.e., the guide surface 112, of the coil 111. Therefore, if a shock that is in a direction different from the vibration directions of the vibrating part 120 is applied to the linear vibration generator 100, the vibrating part 120 may not collide or have friction directly with the guide surface 112, and thus noise can be prevented from occurring.

The lubricating band 150 is made of a magnetic fluid, which has been described earlier, and the magnetic fluid is gathered by the magnetic force of the magnet 121 at an outer circumferential surface of the magnet 121 to form the lubricating band 150. The lubricating band 150 can not only prevent noise from occurring between the stationary part 110 and the vibrating part 120 that is caused by an external shock, as described above, but also function to provide lubrication between the guide surface 112 and the magnet 121 such that the vibrating part 120 can vibrate smoothly.

As described above, while the linear vibration generator 100 in accordance with an embodiment of the present invention produces large amplitude vibrations by making the vibrating part 120 vibrate at a large amplitude using the resonance effect, the liner vibration motor 100 can prevent excessive vibration of the vibrating part 120 or the noise caused by an external shock.

Especially, the coil 111 and the magnet 121 are formed in the shape of a rectangular pillar, and this can enhance the effect of preventing the noise caused by an external shock in a particular direction. This will be described in more detail later.

Figure 2:
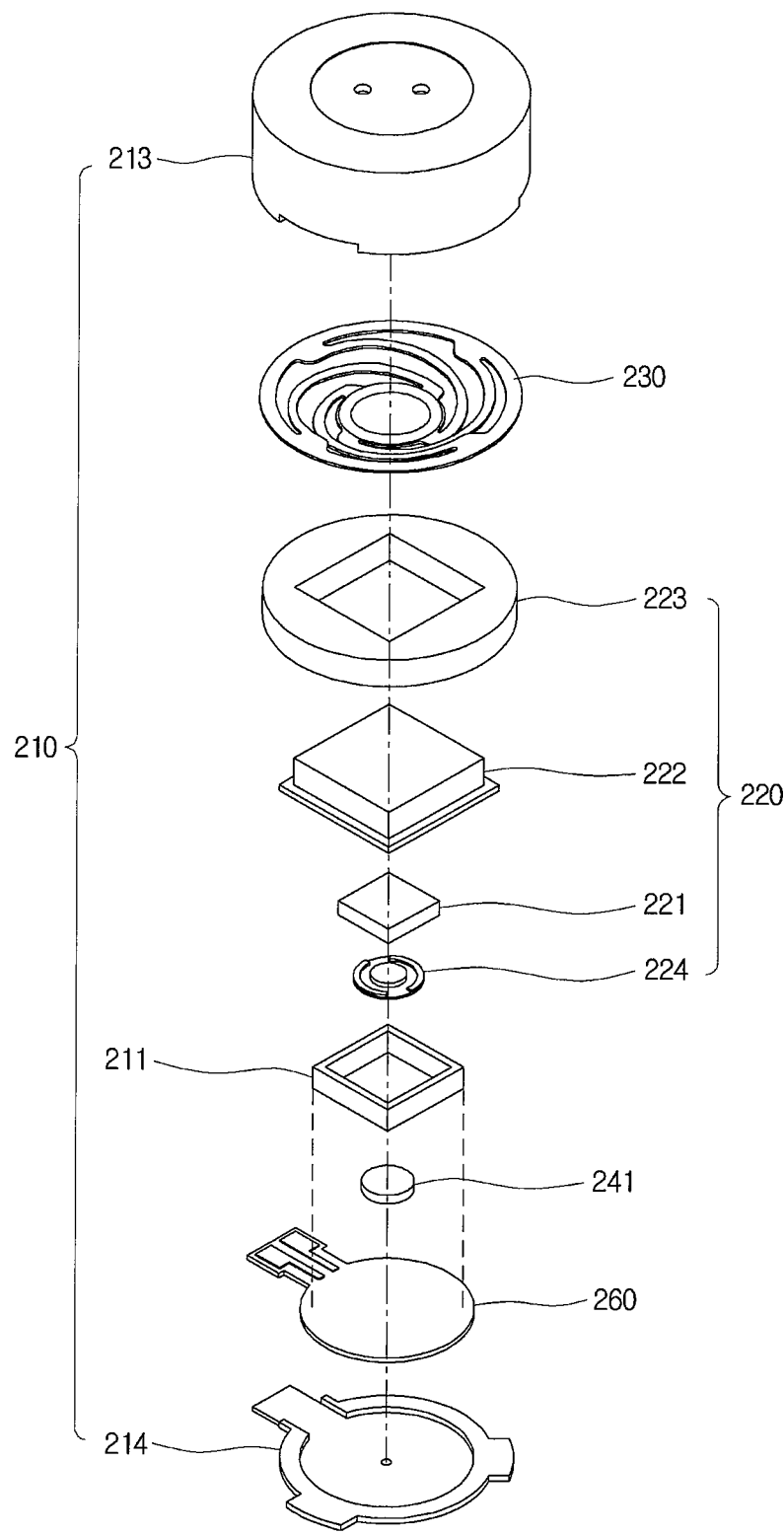
FIG. 2 is an exploded perspective view of a linear vibration generator in accordance with another embodiment of the present invention.
Figure 3:
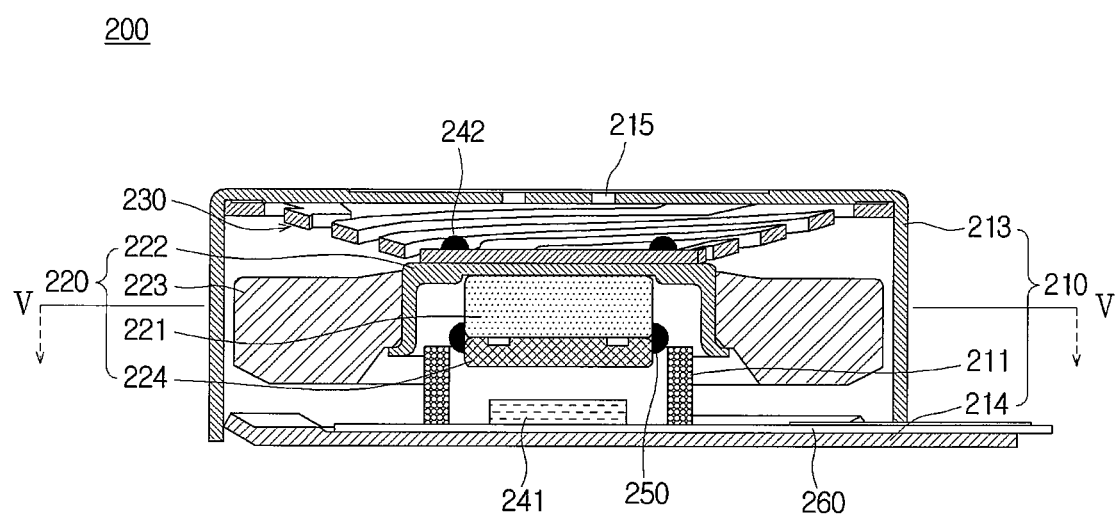
FIG. 3 is a cross-sectional view of a linear vibration generator in accordance with an embodiment of the present invention.

FIG. 2 is an exploded perspective view of a linear vibration generator in accordance with another embodiment of the present invention, and FIG. 3 is a cross-sectional view of a linear vibration generator in accordance with an embodiment of the present invention.

Referring to FIGS. 2 and 3, a linear vibration generator 200 in accordance with another embodiment of the present invention includes a stationary part 210, a vibrating part 220 and an elastic member 230.

The stationary part 210 includes a rectangular pillar-shaped coil 211 having a hollow part therein, a housing 213 and a base 214, and the vibrating part 220 includes a rectangular pillar-shaped magnet 221, a yoke 222, a weight 223 and a plate yoke 224.

A circuit board 260 is mounted on the base 214, and the coil 211 is electrically connected to the circuit board 260. That is, the coil 211 is fixed to the base 214, and the circuit board 260 supplies an electric current to the coil 211. The housing 213 having a space formed therein covers the coil 211 and is coupled to the base 214.

A first cushion 241 is coupled to the circuit board 260 mounted on the base 214.

One side of the elastic member 230 is coupled to an inner surface of the housing 213, and the other side of the elastic member 230 is coupled to the yoke 222. Although it is not illustrated, the yoke 222 has a hollow part, one side of which is closed, formed therein, and the rectangular pillar-shaped magnet 221 is coupled to the hollow part inside the yoke 222. The weight 223 is coupled to an outer surface of the yoke 222, and the plate yoke 224 is coupled to one surface, i.e., the surface facing the base 214, of the magnet 221. Therefore, the vibrating part 220 having the magnet 221, the yoke 222, the weight 223 and the plate yoke 224 can be integrated into a single unit.

Here, some portions of the plate yoke 224 and the magnet 221 are inserted in the hollow part of the coil 211, and the weight 223 is made of a nonmagnetic material.

The yoke 222 and the plate yoke 224 form a magnetic path, through which the magnetic flux of the magnet 221 passes, and form a magnetic field having a constant flux density around the magnet 221 so that an efficient magnetic force can be acted between the magnetic field having a constant flux density and the magnetic field formed by the coil 211 after the electric current is supplied to the coil 211. Accordingly, the yoke 222 and the plate yoke 224 are made of a magnetic material.

Once the electric current having a particular frequency is supplied to the coil 211 by the circuit board 260, the vibrating part 220 vibrates. If the particular frequency is adjusted to correspond to the frequency at which the vibrating part 220 produces the resonance effect by considering the modulus of elasticity of the elastic member 230 and the mass of the vibrating part 220, the vibrating amplitude of the vibrating part 220 can become larger.

As described with reference to FIG. 1, the vibrating part 220 of the linear vibration generator 200 in accordance with another embodiment of the present invention can also collide with the stationary part 210, i.e., the housing 213 and the base 214. Accordingly, the linear vibration generator 200 includes a buffer.

The buffer includes a first cushion 241 and a second cushion 242. As described above, the first cushion 241 is coupled to a surface, facing a surface of the magnet 221, of the circuit board 260 mounted on the base 214. Since the first cushion 241 is the same as the first cushion 141, which has been described with reference to FIG. 1, redundant descriptions are omitted herefrom. The second cushion 242 is coupled to a surface, facing the other surface of the magnet 221, of the elastic member 230. The second cushion 242 will be described by referring to FIG. 4 in the description below.

Therefore, if the vibrating part 220 collides with the circuit board 260 and the housing 213 due to an excessive amplitude of the vibrating part 220, the first cushion 241 and the second cushion 242 can absorb the shock, thus preventing the noise from occurring.

Formed on an outer circumferential surface of the magnet 221 is a lubricating band 250, which is a magnetic fluid that is gathered by the magnetic force of the magnet 221 at an outer circumferential surface of the magnet 221 to form the lubricating band 250. When the vibrating part 220 vibrates linearly as it is guided by the inner surface of hollow part of the coil 211, the lubricating band 250 prevents collision or friction between the magnet 221 and the inner surface of the coil 211 that is caused by an external shock, and thus noise can be prevented from occurring.

Furthermore, the lubricating band 250 allows the magnet 221 to move freely along the inner surface of the coil 211, preventing the deterioration in the vibrating efficiency of the vibrating part 220. The magnet 221 is manufactured in such a way that the magnet 221 is spaced apart from the inner surface of the coil 211 as long as a portion of the lubricating band 250 can be in contact with the inner surface of the coil 211.

Figure 4:
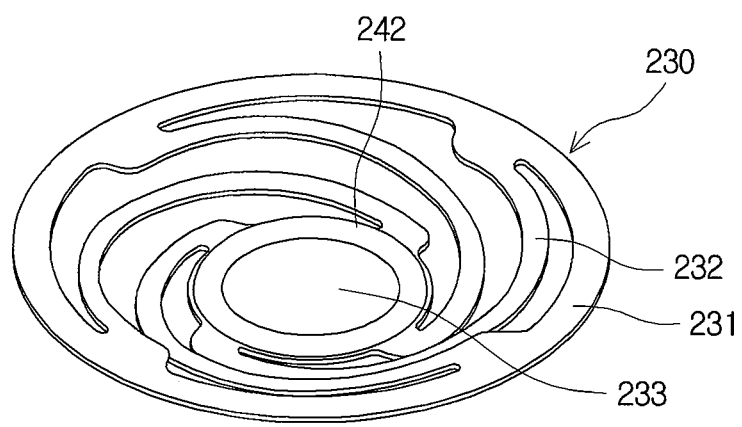
FIG. 4 is a perspective view illustrating a second cushion formed on a spring member of a linear vibration generator in accordance with another embodiment of the present invention.

FIG. 4 is a perspective view illustrating a second cushion formed on a spring member of a linear vibration generator in accordance with another embodiment of the present invention.

Referring to FIG. 4, the elastic member 230 is constituted by a ring-shaped rim 231, a disk-shaped flat panel 233 and a plurality of elastic bridge parts 232, which connect the rim 231 and the flat panel 233 to each other. The second cushion 242 is coupled to the flat panel 233.

The elastic member 230 is made of an elastic material. Thus, the rim 231 and the flat panel 233 provide elasticity in directions parallel to the central axis. Here, the rim 231 is coupled to the housing 213 (refer to FIG. 3), and the flat panel 233 is coupled to the yoke 222 (refer to FIG. 3).

As described with reference to FIG. 1, the second cushion 242 can be made of an elastic material or magnetic fluid. If a magnetic fluid is used for the second cushion 242, the magnetic force of the magnet 221 (refer to FIG. 2) converges the magnetic fluid to form the second cushion 242. An injection hole 215 for injecting the magnetic fluid forming the second cushion 242 can be formed in the housing 213. As described in FIG. 4, the second cushion 242 is coupled along the edge of the flat panel 233. This is because the magnetic flux of the magnet 221 is concentrated around the edge of the flat panel 233 due to the paths formed by the yoke 222 and the flat panel 233. That is, since the magnetic fluid converges to a place having a higher flux density, the second cushion 242 can have such a shape as described in FIG. 4.

Referring to FIG. 3 again, when a portion of the magnet 221 is inserted into the hollow part of the coil 211 while the vibrating part 220 vibrates, the inner side of the coil 211 can be sealed by the lubricating band 250. If the magnet 221 continues to descend while the coil 211 is sealed by the lubricating band 250, a portion of the lubricating band 250 made of the magnetic fluid may be broken or the magnet 221 may not descend smoothly because of the air pressure inside the coil 211.

To prevent this, the air inside the hollow part of the coil 211 has to move freely from the inside to the outside of the coil 211. This will be described by referring to FIG. 5.

Figure 5:
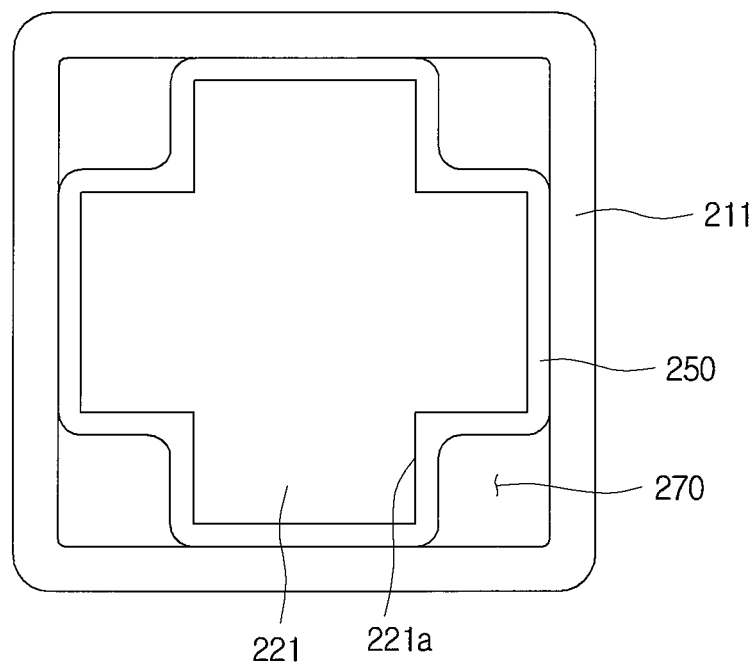
FIG. 5 is a cross-sectional view of a coil and a magnet, based on a transversal line V-V of FIG. 3, in a linear vibration generator in accordance with another embodiment of the present invention.

FIG. 5 is a cross-sectional view of a coil and a magnet, based on a transversal line V-V of FIG. 3, in a linear vibration generator in accordance with another embodiment of the present invention.

Referring to FIG. 5, a groove 221a is formed in the magnet 221, and the lubricating band 250 is formed on an outer circumferential surface of the magnet 221. With this configuration, a ventilation hole 270 and an inner surface of the coil 211 can be formed.

Therefore, while the vibrating part 220 of the linear vibration generator 200 (refer to FIG. 3) vibrates, the hollow part of the coil 211 is prevented from being sealed by the magnet 221 and the lubricating band 250. That is, since the air inside the hollow part of the coil 211 moves through the ventilation hole 270, the vibrating part 220 can vibrate smoothly.

As described above, the linear vibration generator 100 in accordance with an embodiment of the present invention and the linear vibration generator 200 in accordance with another embodiment of the present invention include the rectangular pillar-shaped coils 111 and 211 and the magnets 121 and 221, respectively.

By forming the coils 111 and 211 and the magnets 121 and 221 in the shape of a rectangular pillar, the contact area between the lubricating bands 150 and 250 and the inner surfaces of the coils 111 and 211 can be increased in directions perpendicular to the four surfaces of the rectangular pillar. As the contact area between the lubricating bands 150 and 250 and the inner surfaces of the coils 111 and 211 becomes greater, the vibrating parts 120 and 220 can be more effectively prevented from being shaken by an external shock.

Therefore, the linear vibration generators 100 and 200 in accordance with the embodiments of the present invention can effectively prevent noise that is caused by shocks applied in four directions to the lubricating bands 150 and 250 and the coils 111 and 211.

Therefore, the linear vibration generators 100 and 200 in accordance with the embodiments of the present invention can be employed in a mobile terminal to which a shock is often applied in a particular direction, even though this is not illustrated.

Furthermore, although it is not illustrated, if the linear vibration generator in accordance with the embodiments of the present invention is employed in a mobile terminal to which multi-directional shocks are expected to be applied, the coil and the magnet can be manufactured in the shape of a polygonal prism having surfaces perpendicular to the corresponding directions. This can effectively prevent the noise of the linear vibration generator caused by the multi-directional shocks.

While the spirit of the present invention has been described in detail with reference to particular embodiments, the embodiments are for illustrative purposes only and shall not limit the present invention. It is to be appreciated that those skilled in the art can change or modify the embodiments without departing from the scope and spirit of the present invention.

What is claimed is:

1. A linear vibration generator comprising:
    a stationary part having a polygonal-prism-shaped coil, the polygonal-prism-shaped coil configured to induce a magnetic field by having an electric current supplied;
    a vibrating part having a polygonal-prism-shaped magnet, a portion of the polygonal-prism-shaped magnet being inserted into the coil;
    an elastic member coupled to the stationary part and elastically supporting the vibrating part such that the vibrating part can move linearly;
    a lubricating band formed on an outer circumferential surface of the magnet such that a portion of the lubricating band is in contact with an inner surface of the coil; and
    a first cushion and a second cushion configured to absorb a shock generated when the vibrating part collides with the stationary part,
    wherein the stationary part comprises a base having a circuit board mounted thereon,
    wherein the first cushion is coupled to a surface of the circuit board, the surface facing one surface of the magnet, and
    wherein the second cushion is coupled to a portion of the elastic member.

2. The linear vibration generator of claim 1, wherein each of the coil and the magnet has a rectangular pillar shape.

3. The linear vibration generator of claim 1, wherein the buffer comprises a second cushion coupled to a surface of the vibrating part, the surface facing the other surface of the magnet.

4. The linear vibration generator of claim 3, wherein the second cushion is formed by a magnetic fluid gathered by a magnetic force of the magnet.

5. The linear vibration generator of claim 1, wherein the second cushion is formed by a magnetic fluid gathered by a magnetic force of the magnet.

6. The linear vibration generator of claim 1, wherein the lubricating band comprises a magnetic fluid gathered by a magnetic force of the magnet at an outer circumferential surface of the magnet.

7. The linear vibration generator of claim 1, wherein:
    the stationary part comprises:
        a base having the coil fixed thereto; and
        a housing coupled to the base and covering the coil, and
    the vibrating part comprises:
        a yoke having a one side closed hollow part formed therein, the magnet being coupled to the hollow part; and
        a weight coupled to an outer side of the yoke.

* * * * *